United States Patent [19]

Natusch et al.

[11] Patent Number: 5,168,558
[45] Date of Patent: Dec. 1, 1992

[54] APPARATUS AND METHOD FOR PROVIDING DISTRIBUTED CONTROL IN A MAIN MEMORY UNIT OF A DATA PROCESSING SYSTEM

[75] Inventors: Paul J. Natusch, Westford; Eugene L. Yu, Groton; David C. Senerchia, Shrewsbury, all of Mass.

[73] Assignee: Digital Equipment Corporation, Maynard, Mass.

[21] Appl. No.: 495,133

[22] Filed: Mar. 19, 1990

Related U.S. Application Data

[60] Division of Ser. No. 453,088, Dec. 21, 1989, Pat. No. 4,954,946, which is a continuation of Ser. No. 823,687, Jan. 26, 1986, abandoned.

[51] Int. Cl.$^5$ .................... G06F 12/00; G06F 13/00
[52] U.S. Cl. .................... 395/425; 395/725; 364/231.9; 364/243; 364/264.6
[58] Field of Search ... 364/200 MS File, 900 MS File; 395/425, 725

[56] References Cited

U.S. PATENT DOCUMENTS

| | | | |
|---|---|---|---|
| 3,343,140 | 9/1967 | Richmond et al. | 364/200 |
| 4,028,675 | 6/1977 | Frankenberg | 364/900 |
| 4,048,623 | 9/1977 | Gruner | 364/200 |
| 4,095,265 | 6/1978 | Vrba | 364/200 |
| 4,096,571 | 6/1978 | Vander Mey | 364/200 |
| 4,099,231 | 7/1978 | Kotok et al. | 364/200 |
| 4,229,790 | 10/1980 | Gilliland et al. | 364/200 |
| 4,236,207 | 11/1980 | Rado et al. | 364/200 |
| 4,245,303 | 1/1981 | Durvasula | 364/200 |
| 4,250,547 | 2/1981 | Matsumoto | 364/200 |
| 4,313,162 | 1/1982 | Baun et al. | 364/200 |
| 4,319,324 | 3/1982 | Johnson et al. | 364/200 |
| 4,366,538 | 12/1982 | Johnson et al. | 364/200 |
| 4,376,974 | 3/1983 | Stewart et al. | 364/200 |
| 4,432,055 | 2/1984 | Salas et al. | 364/200 |
| 4,468,731 | 8/1984 | Johnson et al. | 364/200 |
| 4,476,528 | 10/1984 | Matsumoto et al. | 364/200 |

FOREIGN PATENT DOCUMENTS 2537787 3/1977 Fed. Rep. of Germany.

OTHER PUBLICATIONS

Thurber, "A Systematic Approach to the Design of Digital Bussing Structures," Fall Joint Computer Conference 1972, pp. 719-740.
Levy, "Buses, The Skeleton of Computer Structures," Chapter 11 of The PDP-11 Family, pp. 269-299 (1978).
Gustavson, "Computer Buses-A Tutorial," IEEE Micro (Aug. 1984).

*Primary Examiner*—Eddie P. Chan
*Attorney, Agent, or Firm*—Finnegan, Henderson, Farabow, Garrett and Dunner

[57] ABSTRACT

A main memory unit for a data processing system has at least one memory board and allows each memory board to process data simultaneously. Each memory board may also include a plurality of memory array units which also can process data simultaneously. The main memory unit includes a memory interface unit, at least one memory board, and a memory unit bus for transferring address, data, command, and memory status signals between the memory boards and the memory interface unit.

25 Claims, 4 Drawing Sheets

APPARATUS AND METHOD FOR PROVIDING DISTRIBUTED CONTROL IN A MAIN MEMORY UNIT OF A DATA PROCESSING SYSTEM

This is a division of application Ser. No. 07/453,088, filed Dec. 21, 1989, now U.S. Pat. No. 4,954,946 which is a continuation of Ser. No. 823,687, filed Jan. 26, 1986, now abandoned.

RELATED APPLICATIONS

This application is related to the following Patent Applications, all of which were filed in the U.S. Patent and Trademark Office on the filing date of the present Patent Application.

APPARATUS AND METHOD FOR ADDRESING SEMICONDUCTOR ARRAYS IN A MAIN MEMORY UNIT ON CONSECUTIVE SYSTEM CLOCK CYCLES; U.S. patent application Ser. No. 06/823,951; filed Jan. 29, 1986, now U.S. Pat. No. 4,791,552: by Paul J. Natusch; David C. Senerchia; and Beverly A. Henry as Administratrix of the Estate of John F. Henry, Jr., Deceased.

APPARATUS AND METHOD FOR RESPONDING TO AN ABORTED SIGNAL EXCHANGE BETWEEN SUBSYSTEMS IN A DATA PROCESSING SYSTEM; U.S. patent application Ser. No. 06/823,775; filed Jan. 29, 1986, now U.S. Pat. No. 4,858,173: by Robert E. Stewart; James B. Keller; Paul J. Natusch; Eugene L. Yu; and Beverly A. Henry as Administratrix of the Estate of John F. Henry, Jr., Deceased.

BACKGROUND OF THE INVENTION

1. Field of the Invention

This invention relates generally to data processing systems and more particularly to the memory unit of such systems which is used for storing the signal groups required for the current operation of the data processing system.

2. Description of the Related Art

Referring to FIG. 1, a typical data processing system configuration is shown. The illustrated data processing system includes central processing units 10 and 11, input/output units 13 and 14, a main memory unit 15, and a system bus 19 coupling together the central processing, input/output, and main memory units of the data processing system. The central processing unit 10 or 11 processes groups of logic signals according to software and/or firmware instructions. The logic signal groups to be processed as well as the currently executing program are typically stored in the main memory unit 15.

A console unit 12 can be coupled to the central processing units and includes apparatus and stored instructions to initialize the system. The console unit 12 can also act as a terminal during the operation of the data processing system. The input/output units 13 and 14 provide a user interface to the remainder of the data processing system components such as terminal units, mass storage units, communication units, and any other units to be coupled to the data processing system.

The detailed function of the units coupled to the system bus 19 is less important to an understanding of the present invention than the fact that these units operate autonomously and communicate with the remainder of the data processing system units by means of the system bus 19. In particular, the system bus 19 is used to store signal groups into and to retrieve signal groups from the main memory unit 15 by the other units.

Referring next to FIG. 2, a block diagram of a typical main memory units 15 found in the related art is shown. The main memory unit 15 includes a memory interface unit 21 that exchanges signals with the system bus 19. The memory interface unit 21 is coupled to a memory unit bus 22 and the memory unit bus 22 has memory array units 23 coupled thereto. The memory array units 23 each comprises a plurality of logic signal storage elements organized in groups so that each group of storage elements can be accessed by a unique logic signal group address.

The memory interface unit 21 includes apparatus for controlling the exchange of logic signal groups, identified by a logic signal group addresses, between the memory array units 23 and the system bus 19. The memory interface unit 21 also includes apparatus for identifying signal activity on the system bus 19 directed to the memory unit 15 as well as to apparatus for returning logic signal groups to the data processing units which had requested specified logic signal groups from main memory 15. Buffering of the data logic signal groups, error correction, and generation of control signals are also typically performed in the memory interface unit 21 in the related art.

The foregoing conventional main memory architecture limits the amount of activity that can be performed in the main memory unit because all activity must be performed under the control of a memory interface unit 21, so only a single activity operation may be performed at one time unless parallel processing apparatus is included for simultaneous processing of a plurality of signal groups.

A need has therefore been felt arisen for apparatus and methods of operation for a main memory unit that can permit multiple simultaneous operations involving that main memory unit. This requirement is particularly stringent in the computer systems referred to as "write through" data processing systems in which each a logic signal group from a central processing unit is immediately stored or written into the main memory unit. The memory activity resulting from write-through data processing systems can result in performance deterioration unless the main memory unit is designed to accommodate the increased activity.

SUMMARY OF THE INVENTION

It is an object of the present invention to provide an improved data processing system.

It is a further object of the present invention to provide an improved main memory unit for a data processing system.

It is yet another object of the present invention to provide a plurality of memory array unit in a main memory unit with, each array unit capable of functioning independently of the other memory arrays units.

It is a still further object of the present invention to provide a bus for the memory array units coupled to a plurality of memory array units and to an array interface unit couples the array unit bus with the system bus.

To achieve these objects, and in accordance with the purpose of the invention, as embodied and broadly described herein, a main memory unit of this invention is provided for processing data signals by storing and retrieving the data signals in response to requests from a data processing system. The data processing system generates command and address signals as part of the requests to the main memory unit and which receives memory status signals from the main memory unit indicating the ability of the main memory to process the data signals. The main memory comprises: memory interface unit means, coupled to the data processing system, for forming the memory status signals from board status signals and for exchanging the data, address, command, and board status signals with the data processing system; a memory unit bus, coupled to the memory interface unit means, for transferring the address, data, command and board status signals with the memory interface unit means; and at least one memory board coupled to the memory unit bus and responsive to the command signals. Each of the memory boards includes storage means for processing the data signals independently of any other memory boards, and board status means for generating the board status signals indicating the current availability of the storage means to process the data signals.

Also, in accordance with the invention, a data processing system is provided which has a main memory unit that includes a plurality of memory boards for storing groups of logic signals. Each memory board includes memory array units that can process information independently of other memory array units. The boards can also process information independently of other boards. Since the memory array units and boards process data independently, several arrays and boards can operate simultaneously.

Each memory array unit preferably stores an addressable group of data signals having the same size as the logic signal groups which are transferred on a system bus for the data processing system. The addressing convention of each memory array unit is preferably adapted to ensure that the probability of interfering activity in each array unit is low by having a consecutive storage locations spread over the different memory array units.

The main memory unit is thus structured to provide a pipeline type of overlapping activity to increase efficiency. Because manipulation of the individual storage cells in a main memory unit usually requires the largest amount of memory time, allowing the memory arrays to perform this time consuming activity independently and simultaneously reduces main memory unit delay in most circumstances (except perhaps during masked write operations).

These and other features of the present invention will be understood upon reading of the following description along with the drawings.

DETAILED DESCRIPTION OF THE PREFERRED EMBODIMENT

1. Detailed Description of the Figures

Figure 1:
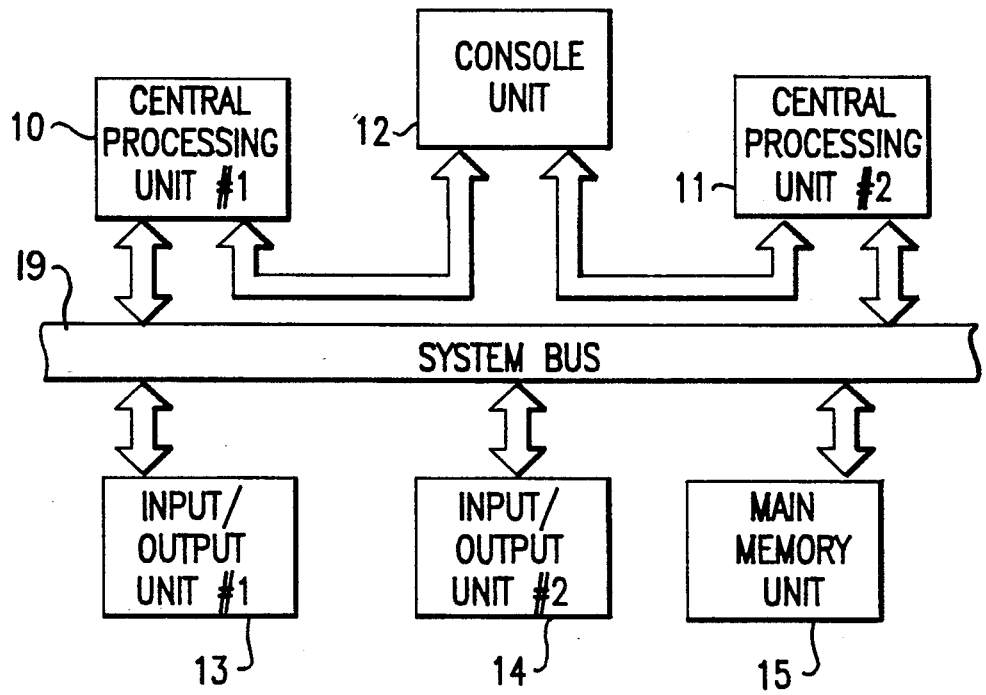
FIG. 1 is a block diagram of the components of a data processing system capable of utilizing the present invention.
Figure 2:
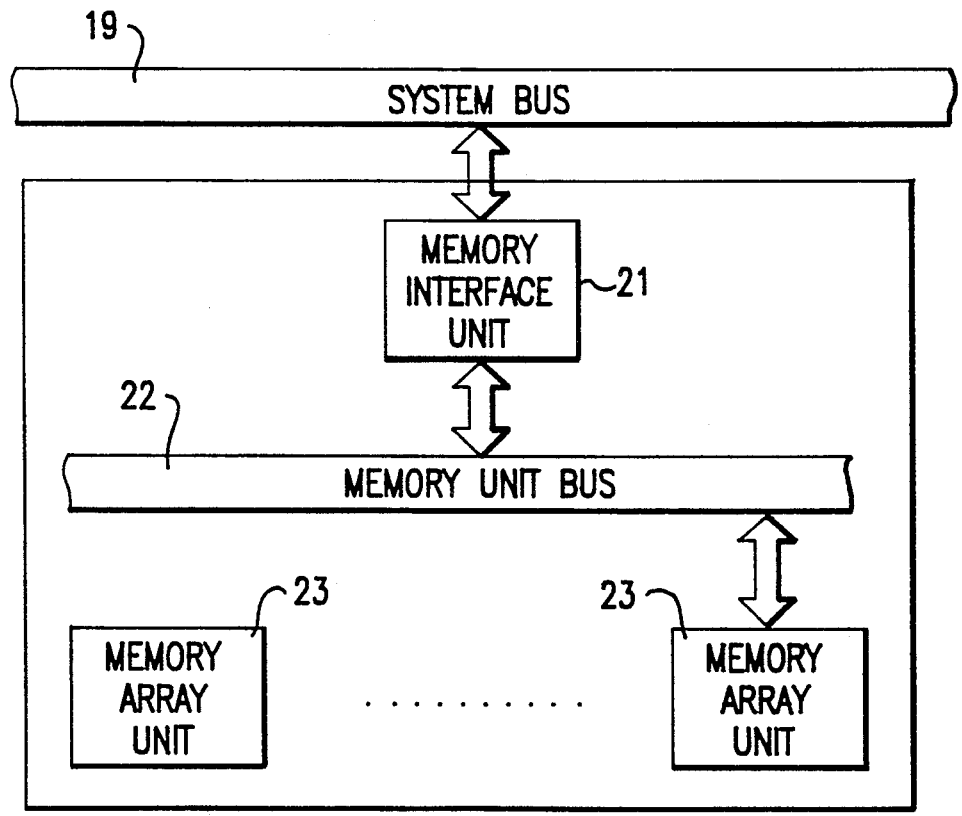
FIG. 2 is a block diagram of a main memory unit typically employed in data processing systems.

FIG. 1 and FIG. 2 have been previously described with reference to data processing systems generally.

Figure 3:
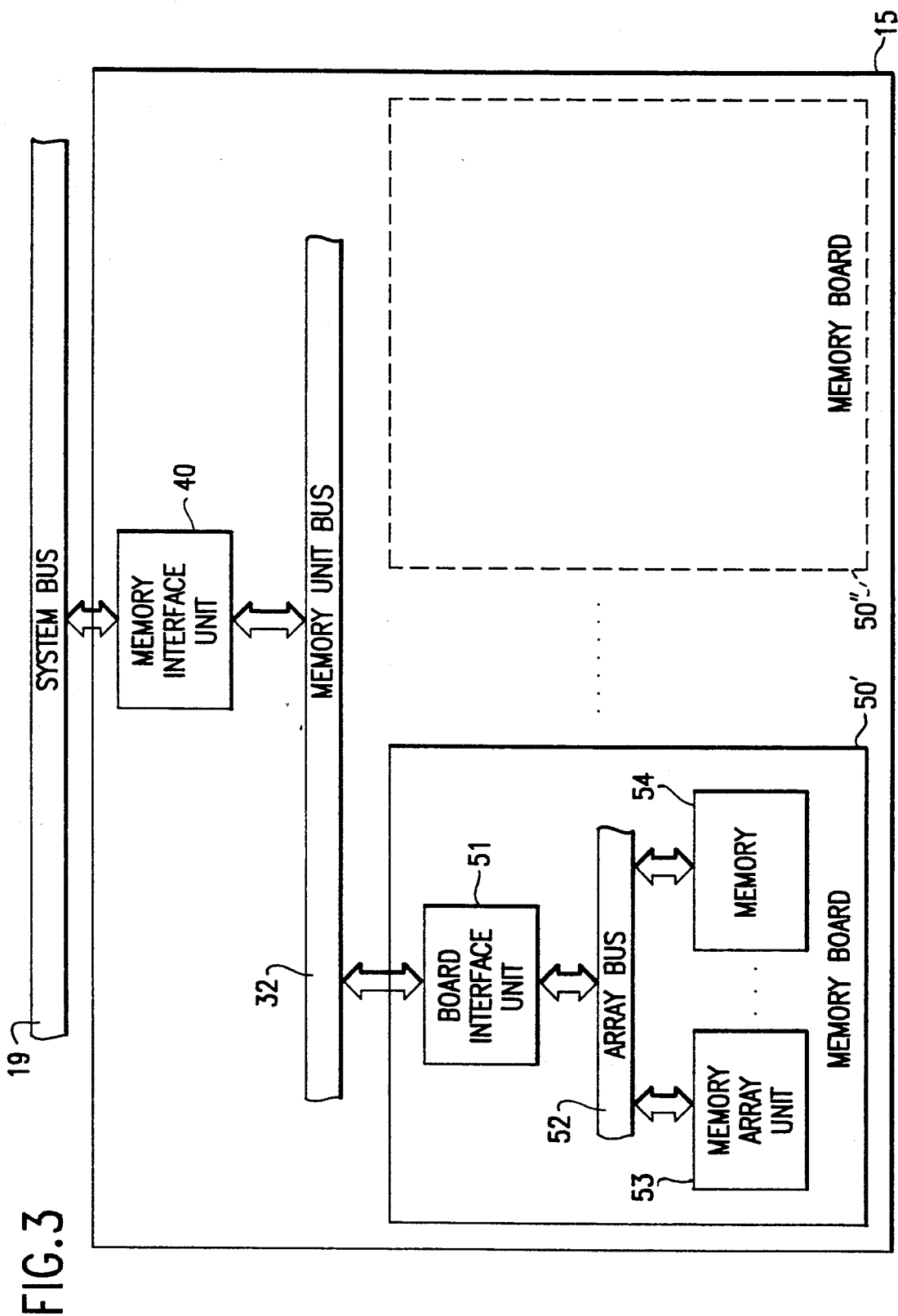
FIG. 3 is a block diagram of a main memory unit according to the present invention.

Referring next to FIG. 3, the basic structure of a main memory unit 15' according to the present invention is shown. The main memory unit 15' includes a memory interface unit 40 that couples a main memory unit 15' to the system bus 19. The memory interface unit 40 is coupled to and exchanges signals with a memory unit bus 32. The memory unit bus 32, in turn, exchanges logic signal groups with a plurality of memory boards. Each memory board 50 includes a board interface unit 51 that exchanges logic signals with the memory unit bus 32. The board interface unit 51, in turn, exchanges logic signal groups with array bus 52 on board 50, while a plurality of memory array units 53 also on board 50, are coupled to the array bus 52.

Figure 4:
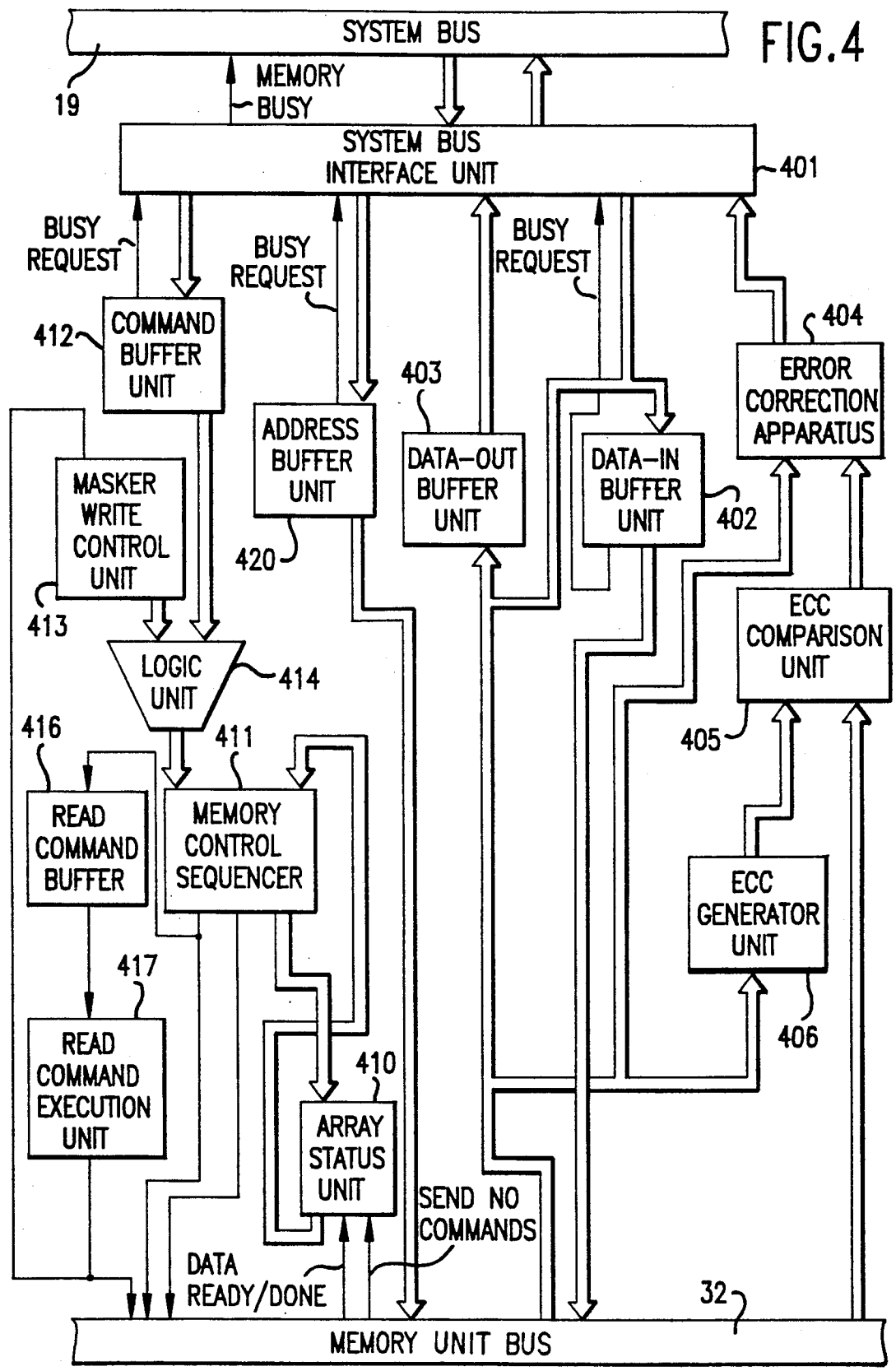
FIG. 4 is a block diagram of the apparatus providing an interface, in the main memory unit, between memory boards and the data processing system.

Referring next to FIG. 4, a block diagram of the memory interface unit 40 is shown. Included in memory interface unit 40 is a system bus interface unit 401 which controls the exchange of signals, including control signals between the system bus 19 and the remainder of the main memory unit 15'. One of the control signals exchanged by system bus interface unit 40 is a control signal labelled Memory Busy.

Also in memory interface unit 40 is a data-in buffer unit 402 which provides a temporary storage for certain logic signal groups representing data signals to be stored in the memory arrays 53. From the data-in buffer unit 402, the stored data signals are transferred to the memory unit bus 32. A data-out buffer unit 403 in memory interface unit 40 provides a temporary storage for data signals from the main memory unit 15' that are to be transferred to a unit requesting those signals. A data path for data signals via memory bus 32, from the memory array unit 53 to the data-in buffer 402 is provided for a masked write operation, which is an operation that only partially replaces a data signal at a designated location (address) in main memory unit 15' with data from other units.

Also included in memory interface unit 15' are an ECC (error correcting code) generator unit 406, an ECC comparison unit 405, and an error correction apparatus 404. These three units verify the accuracy of the logic signal groups being transferred from the main memory unit 15' to other units of the data processing system.

The memory interface unit 401 also includes an address buffer unit 420 for temporary storage of addresses of data signals being stored in or retrieved from the main memory unit 15'. The address buffer unit 420 is coupled to the system bus interface unit 401 and to the memory unit bus 32 to implement the transfer of addresses between the memory array units 53 and the system bus 19.

Included in the memory interface unit 40 are also a multiplicity of units for controlling and monitoring the operation of the main memory unit 15'. An array status unit 410 receives signals from and applies signals to a memory control sequencer 411. The array status unit 410 also receives Data Ready/Done and Send No Command signals from the memory boards 50. A command buffer unit 412 provides a temporary storage for commands that are received from and applied to the system bus interface unit 401. The command buffer unit 412 also applies control signals to a logic unit 414, which also receives signals from a masked write control unit 413. The memory control sequencer 411 applies signals to the memory unit bus 32 and to a read command buffer 416 to effect temporary storage. The read command buffer 416 applies signals to a read command execution unit 417 which in turn applies signals to the memory unit bus 32 and to the masked write control unit 413.

As indicated above, the array status unit 410 receives Data Ready/Done signals and Send No Command signals from the memory boards 50. The Send No Command signals are used to insure that each memory array unit 53 is processing only one read command or a refresh operation. The Data Ready/Done signals are used to control status bits in the array status unit 410. The Data Ready/Done signals are asserted by a memory array unit prior to its being capable of processing another read operation, the data signals having not been removed. The Send No Command signal is asserted and remains asserted prior to the assertion of the Data Ready/Done signal and remains asserted until the memory interface unit 40 has removed the data signal groups. Logic components (not shown) in the memory interface unit 21 insure that array units commands are not sent to array units memory arrays 53 between the times that the memory interface unit 40 begins removing one logic signal group and completes the removal of another logic signal group.

It will be apparent to a person of ordinary skill that interconnections between the components of the memory interface unit 40 that are typically used by memory interface units and have standard functions have not been explicitly illustrated. However, those signal lines that are needed for a complete explanation of the operation of the present invention are in FIGS. 3-5.

As shown in FIG. 4, Busy Request lines couple control signals from the data-in buffer unit 402, the address buffer unit 420, and the command buffer unit 412 to the system bus interface unit 401. The presence of appropriate signals on these lines can result in a Memory Busy signal being applied to the system bus 19 (e.g., for use with a system bus arbitration unit). Similarly, the array status unit 410 receives Data Ready/Done signals and Send No Command signals, described above, from the memory boards 50.

Figure 5:
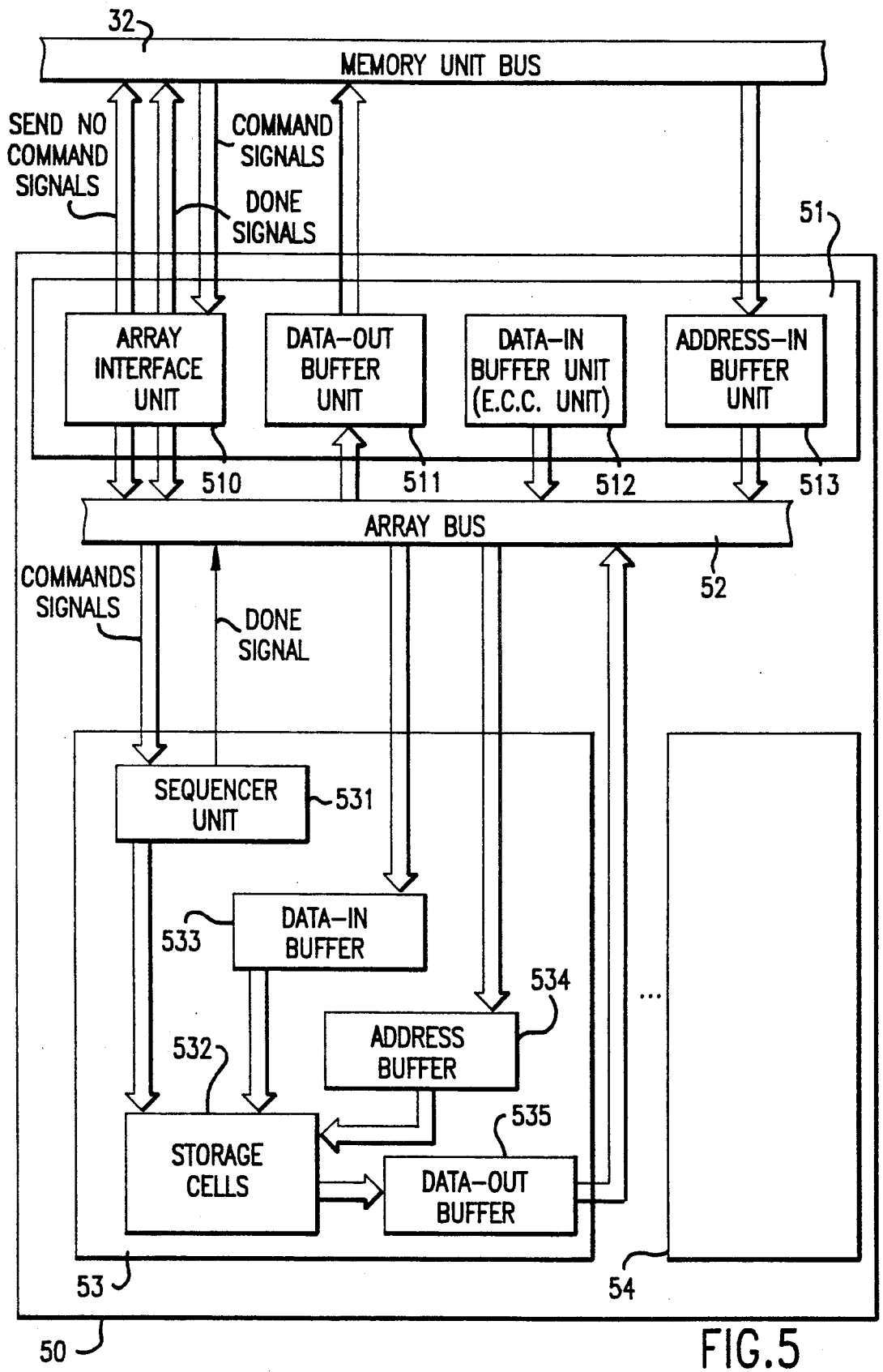
FIG. 5 is a block diagram of apparatus comprising the memory boards according to the present invention.

In FIG. 5, a preferred embodiment of an apparatus implementing the memory boards 50 according to the present invention is shown. In a memory board 50, a board interface unit 51 resides and includes an array interface unit 510, a data-out buffer unit 511, a data-in buffer unit 512, and an address-in buffer unit 513. The array interface unit 510 receives command signals from the memory unit bus 32 and applies status signals to the memory unit bus 32. The array interface unit 510 also applies command signals to an array bus 52 and receives (Done) status signals from the array bus 52.

The data-out buffer unit 511 provides temporary storage of data signals applied to the array bus 52 from the memory array units 53. The address-in buffer unit 513 provides temporary storage of addresses to be applied to the array bus 52 and the data-in buffer unit 512 provides temporary storage of data signals to be stored in the storage cells 532 of the memory array units 53. The data-in buffer unit 512 also includes ECC bit generation apparatus for storing error corrections codes along with the data signals.

The memory array units 53, illustrated in FIG. 5 each include a sequencer unit 531 for receiving commands from the array bus 52 and for applying (Done) status signals to the array bus 52. The sequencer unit 531 controls the operation of the storage cells 532 within the associated memory array unit 53 in response to commands received from the array bus 52. The memory array unit 53 also includes a data-in buffer unit 533 for temporary storage of data signals to be stored in the storage cells 532, an address buffer unit 534 for temporary storage of addresses of the storage cells 532 to be manipulated by the sequencer unit 531, and a data-out buffer unit 535 for temporary storage of the data signals being retrieved from the storage cells 532. The data in buffer and the lines into that buffer are preferably the same as the data-out buffer and lines into that buffer.

2. Operation of the Preferred Embodiment

Referring once again to FIGS. 3 and 5, the storage cells 532 in memory array units 53 on a memory board 50 are implemented in such a manner that the number of bits of the logic signal groups that are transferred in parallel on the system bus 19, sometimes designated as a word or longword, can be stored in a group of related storage cells 532 in one of the memory array units 53. That is, the word or longwood associated with an address signal group can be completely stored in one memory array unit 53 responding to an associated address so that each logic signal group transferred on the system bus 19 is related to a single memory array unit 53.

The memory array units 53 are typically implemented in a technology that is considerably slower than the technology used in implementing the remainder of the signal processing circuits of the data processing system. As a result, the time needed to perform an operation involving the memory array units 53 can occupy multiple system clock cycles. To minimize the impact of the relatively slow memory array units speeds, the addresses can be arranged so that each memory array unit 53 does not itself contain cells 532 responsive to consecutive addresses, but instead contains cells 532 having addresses which are in consecutive sequence with the addresses of other arrays on the board. Furthermore, the memory boards 50 are also preferably adapted so that the same memory array unit will not contain a cell 532 responsive to a second address in a consecutive sequence of addresses until all the other arrays have been addressed.

In a typical embodiment of the present invention, the main memory unit 15' can include 8 memory boards 50 each including 4 memory array units 53. In this situation, each memory array unit 53 can be adapted to respond to every $32^{nd}$ address in a consecutive memory array address sequence (wherein each memory address can be associated with a plurality of signal groups addressable by other units of the data processing system. It is recognized that this capability may not be necessary but using the present invention the memory boards as described in the preferred embodiment can support the processing of four write commands simultaneously or one read command.

In the preferred embodiment, an address can be applied to the memory array units 53 approximately three clock cycles after an address/command cycle is begun on the system bus 19. During this period of time, a determination is made in the memory interface unit 40 whether the specified address is valid, whether a memory command is involved, and whether the addressed memory array unit 53 that will process the command is available. Thus, the main memory unit 15' has the apparatus to transfer the logic signal groups to the appropriate memory array unit 53 with sufficient rapidity so as not to limit the memory activity under normal circumstances.

The Busy Request signals can be generated by the command buffer unit 412, the address buffer unit 420, and the data-in buffer unit 402 when these units are in danger of being unable to process incoming logic signal groups in an appropriate manner. The Busy Request signals are applied to the system interface unit 401 which can then apply a Memory Busy signal to the system bus 19 or to dedicated signal paths (not shown). In the preferred embodiment, the Memory Busy signal, generated as a result of an earlier transaction, may be used to inform a unit in the data processing system that an attempted transaction was not successful prior to the notification of such a result by the means of the Confirmation Busy signal. In this manner, the unit of the data processing system can begin attempting to reinitiate the transaction sooner. The Memory Busy signal is also used to prevent a memory arbitration unit from awarding access to the system bus 19 for a transaction that may not be successful.

It will be apparent to persons of ordinary skill that control signals exchanged between memory boards 50 and the memory interface unit 40 which permit the memory array unit 53 to function independently, also permit each of the memory boards 50 to function independently from the other memory boards and from the memory interface unit 40 itself. As a result, memory boards with arrays which operate at different speeds can be used in the main memory units.

The foregoing description is included to illustrate the operation of the preferred embodiment and is not meant to limit the scope of the invention. The scope of the invention is to be limited only by the following claims. From the foregoing description, many variations will be apparent to those skilled in the art that would be encompassed by the spirit and scope of the invention.

What is claimed is:

1. A main memory unit for processing data signals by storing and retrieving said data signals in response to requests from a data processing system which generates command signals and address signals as part of said requests to said main memory unit and which receives memory status signals from said main memory unit indicating the ability of said main memory unit to process said data signals, said main memory unit comprising:

memory interface unit means, coupled to said data processing system, for forming said memory status signals from board status signals and for exchanging said data, command, memory status, and address signals with said data processing system;

a memory unit bus, coupled to said memory interface unit means, for transferring said address, data, board status, and command signals with said memory interface unit means; and at least one memory board coupled to said memory unit bus and responsive to said command signals, each said memory board including;

storage system processing means for processing said data signals concurrently with any other memory board, and board status means for generating said board status signals including a ready/done signal generated just prior to the time when said storage system processing means has completed its processing operations and indicating the impending completion of said storage system processing means' completion of its processing operations, and for generating second signals when said storage system processing means has completed its processing operations indicating the current availability of said storage system processing means to process said data signals.

2. A main memory unit according to claim 1 wherein said storage system processing means includes a plurality of memory array units each including means for processing said data signals in response to said address signals and command signals concurrently with other of said memory array units and for generating an array status signal indicating the current availability of that memory array unit to process said data signals.

3. A main memory unit according to claim 2 wherein each said memory board also includes an array bus, coupled to said plurality of memory array units, for tansferring said command, data, address, and array status signals with said plurality of memory array units.

4. A main memory unit according to claim 3 wherein each said board status means includes board interface means, coupled between said memory unit bus and said array bus, for forming said board status signals for an associated memory board from said array status signals.

5. A main memory unit according to claim 4 wherein said board interface means includes means for temporarily storing said address, command, data and board status signals.

6. A main memory unit according to claim 3 wherein each of said memory array units includes:

a plurality of storage cells for processing said data signals at locations corresponding to said address signals, buffer means, coupled between said plurality of storage cells and said memory unit bus, for providing temporary storage of said data signals and said address signals, and sequencing means, coupled between said array bus and said plurality of storage cells, for controlling processing of said storage cells in accordance with said command signals received from said array bus and for providing said array status signals to said array bus.

7. The main memory unit according to claim 6 wherein said sequencing means includes means for generating said array status signals indicating completion of a processing operation by said storage cells.

8. The main memory unit of claim 1 wherein said memory interface unit means includes means for temporarily storing said data signals,
means for temporarily storing said address signals,
means for temporarily storing said command signals, and
means for processing said memory status signals according to said board status signals.

9. A data processing system comprising:

a system bus for transferring data, address, memory status, and command signals used in said data processing system;

a processing unit coupled to said system bus for generating said command and address signals to be transferred via said system bus, for evaluating said memory status signals, and for exchanging said data signals with said system bus; and a main memory unit coupled to said system bus for processing said data signals by storing and retrieving said data signals according to said address and command signals, said main memory unit including memory interface unit means, coupled to said system bus, for forming said memory status signals from board status signals and for exchanging said data, command, status, and address signals with said system bus, a memory unit bus, coupled to said memory interface unit means for transferring said address, data, board status, and command signals with said memory interface unit means, and at least one memory board, coupled to said memory unit bus and responsive to said command signals, each said memory board including storage system processing means for processing said data signals concurrently with any other memory board, and board status means for generating said board status signals including a ready/done signal generated just prior to the time when said storage system processing means has completed its processing operations and indicating the impending completion of said storage system processing means' completion of its processing operations, and for generating second signals indicating the current availability of said associated storage system processing means to process said data when said storage system processing means has completed its processing operations signals.

10. A data processing system according to claim 9 wherein said storage system processing means includes a plurality of memory array units each including means for processing said data signals in response to said address signals and command signals concurrently with other of said memory array units and for generating an array status signal indicating the current availability of that memory array unit to process said data signals.

11. A data processing system according to claim 10 wherein each said memory board also includes an array bus, coupled to said plurality of memory array units, for transferring said command, data, address, and array status signals with said memory array units.

12. A data processing system according to claim 11 wherein each said board status means includes board interface means, coupled between said memory unit bus and said array bus, for forming said board status signals for an associated memory board from said array status signals.

13. The data processing system of claim 12 wherein said board interface means includes means for temporarily storing said address, command, data and board status signals.

14. A data processing system according to claim 11 wherein each of said memory array units includes:

a plurality of storage cells for processing said data signals at locations corresponding to said address signals, buffer means, coupled between said plurality of storage cells and said memory unit bus, for providing temporary storage of said data signals and said address signals, and sequencing means, coupled between said array bus and said plurality of storage cells, for controlling processing of said storage cells in accordance with said command signals received from said array bus and for providing said array status signals to said array bus.

15. The data processing system of claim 14 wherein said sequencing means includes means for generating said array status signals when said storage cells have completed a processing operation.

16. The data processing system of claim 10 wherein said memory array units are configured to store groups of said data signals, said groups of said data signals having the same number of bits as said system bus.

17. The data processing system of claim 10 wherein said data are stored at locations in said memory array units corresponding to said address signals, and wherein consecutive ones of said locations are distributed over said plurality of memory array units.

18. The data processing system of claim 9 wherein said memory interface unit means includes means for temporarily storing said data signals,
means for temporarily storing said address signals,
means for temporarily storing said command signals, and
means for processing said memory status signals according to said board status signals.

19. The data processing system of claim 9 wherein said memory interface unit means also includes error detection and correction means for detecting and correcting errors in said data signals.

20. A data processing system according to claim 9 further including an input/output unit coupled to said system bus for generating command and address signals for said main memory unit and for transferring said data signals with said main memory unit.

21. A data processing system according to claim 9 wherein said processing unit includes a first central processing unit and a second central processing unit both coupled to said system bus.

22. A method for processing data signals in a main memory unit of a data processing system by storing and retrieving said data signals, the method comprising the steps of:

generating command and address signals from said data processing system to effectuate requests to said main memory unit and exchanging said data, command, and address signals with said main memory unit via a system bus;

transferring, via a memory interface unit, said data, command and address signals between said system bus and a memory unit bus;

transferring said data, command, and address signals betweeen said memory bus and at least one memory board;

processing said data signals in said at least one memory board according to said command and data signals and concurrently with any other memory boards in said main memory unit other than said at least one memory board;

generating board status signals in each said memory board including a ready/done signal generated just prior to the time when said storage system processing means has completed its processing operations and indicating the impending completion of said storage system processing means' completion of its processing operations, and generating second signals when said storage system processing means has completed its processing operations indicating the current availability of the associated board to process said data signals;

transferring said board status signals to said memory interface unit;

forming memory status signals in said memory interface unit from said board status signals, said memory status signals indicating the availability of the main memory unit to process said data signals; and transferring said memory status signals from said memory interface unit to said data processing system.

23. The method of claim 22 wherein the step of processing said data signals in said memory board includes the substeps of transferring said command, data and address signals to a plurality of memory array units in each said memory board via an array bus in each said memory board, each of said plurality of memory array units in each said memory board being coupled to the array bus in that memory board, processing said data signals in one of said memory array units according to said command and data signals and concurrently with the processing of said data signals in others of said plurality of memory array units in the same said memory board, and generating in each of said plurality of memory array units array status signals indicating the current availability of the associated memory array unit to process said data signals; and wherein the step of generating said board status signals includes the step of forming said board status signals from said array status signals.

24. The method of claim 23 wherein the substep of processing said data signals in one of said memory array units further includes the substeps of temporarily storing said data and address signals in said one memory array unit, and controlling the processing of said data signals in said one memory array unit in accordance with said command signals.

25. The method of claim 24 wherein the substeps of generating said array status signals further includes the substep of generating said array status signals to indicate the completion of a processing operation by the associated memory array unit, and wherein the substep of generating said board status signals further includes the substep of generating said board status signals to indicate the completion of a processing operation by said associated memory board.

* * * * *